United States Patent
Nomura et al.

[11] Patent Number: 5,982,565
[45] Date of Patent: Nov. 9, 1999

[54] PLASTIC LENS AND METHOD OF MAKING THE SAME

[75] Inventors: Yoshimitsu Nomura; Masaaki Fukuda; Takashi Ito; Kaneyoshi Yagi, all of Saitama, Japan

[73] Assignee: Fuji Photo Optical Co., Ltd., Saitama, Japan

[21] Appl. No.: 09/033,571

[22] Filed: Mar. 3, 1998

[30] Foreign Application Priority Data

Mar. 31, 1997 [JP] Japan .................................. 9-081533

[51] Int. Cl.⁶ .............................. G02B 3/00; G02B 7/02
[52] U.S. Cl. .......................... 359/819; 359/642; 359/811; 359/818; 264/1.2; 264/2.2; 264/2.3; 264/2.4
[58] Field of Search ..................... 359/811, 818, 359/819, 642; 264/1.2, 2.2, 2.3, 2.4

[56] References Cited

U.S. PATENT DOCUMENTS 4,861,137  8/1989  Nagata ..................................... 350/253
5,905,599  5/1999  Nomura et al. ........................... 359/819

OTHER PUBLICATIONS

"Injection Molding for Thermoplastics", S.E. Tinkham, W.I. Pribble, and E.L. Buckleitner, in Bubois & Pribble's Plastics Mold Engineering Handbook (5th edition), chapter 8, pp. 407–408 (E.L Buckleitner, editor), 1995.

Primary Examiner—Georgia Epps
Assistant Examiner—David Spector
Attorney, Agent, or Firm—Leydig, Voit & Mayer, Ltd.

[57] ABSTRACT

A plastic lens includes an optically functioning section, a flange section disposed at an outer periphery thereof, a reference surface formed at an outer peripheral portion of the flange section and adapted to become a reference for attachment, and a tapered surface formed on at least a part of the outer peripheral portion of the flange section which is located closer to the optically functioning section side than is the reference surface so as to taper down its diameter along the optical axis of the optically functioning section. The tapered surface forms a surface at which a gate for resin injection is located upon manufacture.

5 Claims, 4 Drawing Sheets

PLASTIC LENS AND METHOD OF MAKING THE SAME

BACKGROUND OF THE INVENTION

1. Field of the Invention

The present invention relates to a plastic lens used in optical devices and the like, and a method of making the plastic lens.

2. Related Background Art

There has been known a plastic lens A, as shown in FIG. 5, comprising an optically functioning section C formed at its center part and functioning as an optical lens, and a flange section D formed at the outer periphery of the optically functioning section C. The flange section D is mainly provided for attaching the plastic lens A to a holder or the like.

Such plastic lens A is made by running a resin into a die and injecting the resin into a cavity (hollow portion), which is formed within the die, through a gate. Consequently, after molding, as shown in FIG. 5, a gate section B and the plastic lens A are in a continuous state. Accordingly, making the plastic lens A necessitates a process of separating the gate section B from the plastic lens A.

SUMMARY OF THE INVENTION

As shown in FIG. 6, the inventor has designed, as a method of separating the gate section B from the plastic lens A, a method in which a part of the flange section D is cut off together with the gate section B. In the case where the flange section D is thus severed so as to cut off the gate section B, even when a burr is generated at the cutting surface of the flange section D, the burr would not project to the outer periphery of the plastic lens A. Consequently, the burr at the cutting surface can be prevented from obstructing the attachment of the plastic lens A.

This method of separating the gate section B, however, may have shortcomings as follows. For example, as shown in FIG. 7, when the plastic lens A is fitted into a mounting hole F of a holder E so as to be attached to the latter, a large gap G may occur between the inner surface of the mounting hole F and the cut portion of the flange section D. Consequently, when the plastic lens A is to be secured with an adhesive H, the latter may flow into the gap G. In this case, the adhesive H may penetrate through the gap G to reach the rear side of the optically functioning section C and adhere thereto, for example. Also, when the adhesive H flows into the gap G, it may not uniformly adhere to the plastic lens A in its circumferential direction, whereby the plastic lens A may be partly pulled with a strong force toward the outer periphery thereof as the adhesive H contracts upon or after curing. Such a pulling force may deform the plastic lens A, thereby deteriorating its optical performance.

In order to avoid these shortcomings, the inventor has tried to sever the boundary portion between the flange section D and the gate section B without cutting off the flange section D, and grind off burrs occurring at the cutting surface. In this case, however, since a grinding process is necessary, the manufacture cannot be effected efficiently. Also, since the position where the gate section B has been connected becomes unclear, the optical property of the plastic lens A resulting from the resin injection or the like may not be determined. Thus, when the plastic lens A is used for a taking lens system, an optical system for an optical pickup, or the like, its optical properties may not be utilized effectively.

In order to solve the foregoing problems, it is an object of the present invention to provide a plastic lens which can prevent defects in attachment from occurring and is excellent in productivity. It is also an object to provide a method of making the same.

In order to achieve such an object, the present invention provides a plastic lens comprising an optically functioning section and a flange section disposed at an outer periphery thereof, in which an outer peripheral portion of the flange section is provided with a reference surface which becomes a reference for attachment, the outer peripheral portion of the flange section is provided with a tapered surface having a diameter tapering down from the reference surface along an optical axis of the optically functioning section, and at least the tapered surface is formed with a gate cutting section.

A method of making a plastic lens in accordance with the present invention comprises the steps of forming a lens member having an optically functioning section and a flange section disposed at an outer periphery thereof, in which a tapered surface having a diameter tapering down along an optical axis of the optically functioning section is formed at an outer peripheral portion of the flange section, by resin molding with a gate position located at the tapered surface; and separating from the lens member a gate section continuous with the tapered surface of the lens member.

In these aspects of the present invention, upon molding, the resin is injected from the tapered surface rather than from the reference surface so as to make the plastic lens. Accordingly, when the gate section continuous with the tapered surface is cut after molding, it is unnecessary to cut the reference surface together therewith. Consequently, when fitting the reference surface into a mounting hole of a holder or the like so as to bond the plastic lens to the holder, the adhesive is prevented from flowing between the reference surface and the mounting hole. It is thus possible to eliminate shortcomings such as adhesion of the adhesive to the rear side of the optically functioning section through the cut portion.

Also avoided, for example, are shortcomings in which, upon or after curing, the adhesive partly adheres to the outer periphery of the plastic lens and thereby partly pulls the plastic lens. Accordingly, a decreased in the optical performance of the plastic lens upon attachment can be prevented.

Even in the case where a burr or the like occurs at a cutting surface formed when the gate section continuous with the tapered surface is cut after molding upon manufacture, since the tapered surface is formed closer to the optically functioning section side, i.e., inside, than is the reference surface beforehand, it is unnecessary to separately grind its cutting surface in practice. Accordingly, the plastic lens can be made easily.

Further, since the cutting surface with a burr can be left as it is, the position where the gate section has existed becomes clear. Consequently, in view of the position of the gate section, the optical properties of the optically functioning section can be determined accurately. Accordingly, the plastic lens can be handled easily when in use.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
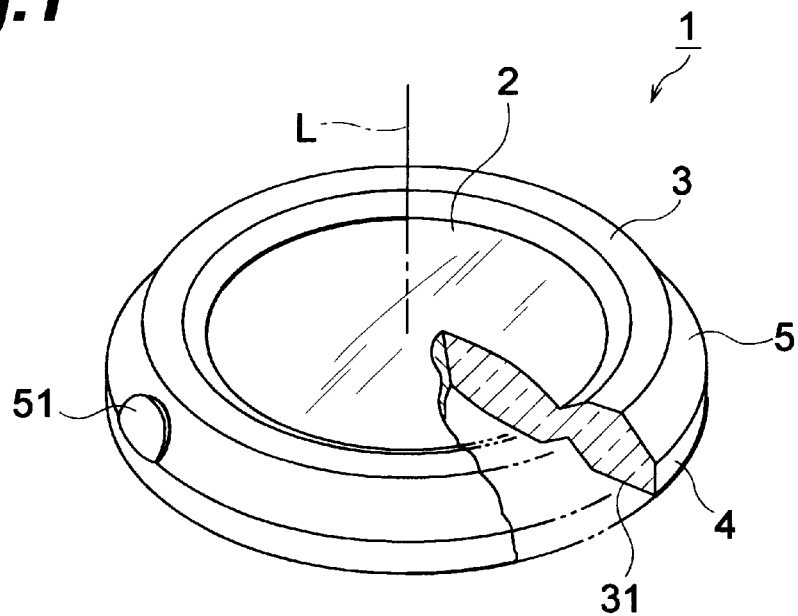
FIG. 1 is a perspective view of a plastic lens.

Various embodiments of the present invention will next be explained with reference to the accompanying drawings. Among the drawings, constituents identical to each other will be referred to with numerals or letters identical to each other, without repeating their explanations. Here, the sizes and proportions in the drawings do not always coincide with those explained.

Figure 2:
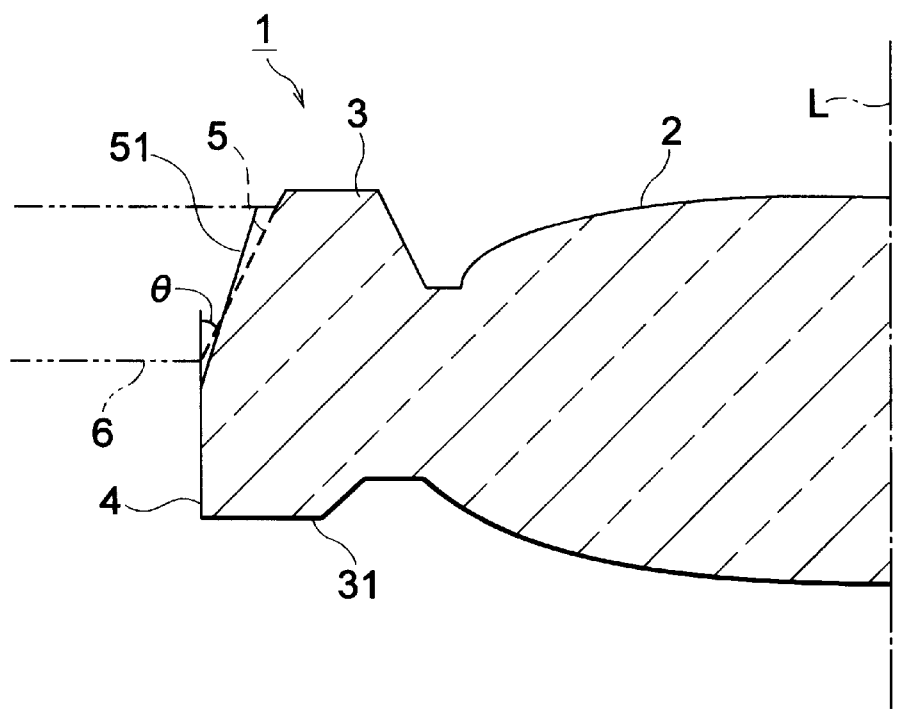
FIG. 2 is an explanatory view of the plastic lens.

FIG. 1 is an explanatory view of a plastic lens in accordance with an embodiment of the present invention. FIG. 2 is a sectional view of a part of the plastic lens. For convenience of explanation, FIG. 1 shows a plastic lens 1 in a state where a part thereof is removed. In FIG. 1, the plastic lens 1 comprises an optically functioning section 2 and a flange section 3 disposed at an outer periphery thereof. The optically functioning section 2 is a part functioning as an optical lens and has a disc-like shape, for example. The flange section 3 is disposed mainly for attaching the plastic lens 1 to a holder or the like and is integrally formed with the optically functioning section 2. While having an annular shape in the plastic lens 1 shown in FIG. 1, the flange section 3 is not restricted to such a shape as long as it is formed at the outer periphery of the optically functioning section 2. For example, it may be formed at a part of the outer periphery of the optically functioning section 2.

As shown in FIG. 1, the outer peripheral portion of the flange section 3 is provided with a reference surface 4. The reference surface 4, which is a part of the outer peripheral surface of the flange section 3, is formed at a lower portion of its outer peripheral portion as shown in FIG. 1, for example. The reference surface 4, which becomes a reference when attaching the plastic lens 1 to a holder or the like, is preferably a peripheral surface substantially in parallel to and concentric with an optical axis L of the optically functioning section 2. The flange section 3 has a bottom surface 31, formed orthogonal to the optical axis L of the optically functioning section 2, functioning as a reference surface, like the reference surface 4, upon attachment of the plastic lens 1.

As shown in FIG. 1, the outer peripheral portion of the flange section 3 is formed with a tapered surface 5. The tapered surface 5, which is a part of the outer peripheral surface of the flange section 3, is formed above the reference surface 4, for example. The tapered surface 5 is a surface where a gate is located upon resin injection when making the plastic lens 1. Projecting from the tapered surface 5 is a gate cutting section 51. The gate cutting section 51 is a trace of cutting formed when a gate section 6 is cut off from the plastic lens 1 upon manufacture. For example, it is a burr or uncut portion left after cutting.

As shown in FIG. 2, the tapered surface 5 tapers down its diameter along the optical axis L of the optically functioning section 2 and is formed closer to the optically functioning section 2, i.e., the center side, than is the reference surface 4. An angle of inclination θ of the tapered surface 5 with respect to the reference surface 4 is determined in view of the projecting length of the gate cutting section 51. Namely, the angle of inclination θ of the tapered surface 5 is set such that the tip of the gate cutting section 51 does not project outside the plastic lens 1 from an extension surface of the reference surface 4. When the gate is positioned at such tapered surface 5, the gate cutting section 51 is prevented from projecting outside the reference surface 4. Consequently, it is not necessary to remove the gate cutting section 51 after cutting off the gate section 6, whereby steps such as grinding can be omitted. Also, as this gate cutting section 51 is left, the direction of resin injection or the like can be easily seen after the plastic lens 1 is made, whereby the optical property of the plastic lens 1 resulting from the resin injecting direction or the like can be determined easily.

In the following, a method of making the plastic lens 1 will be explained.

Figure 3:
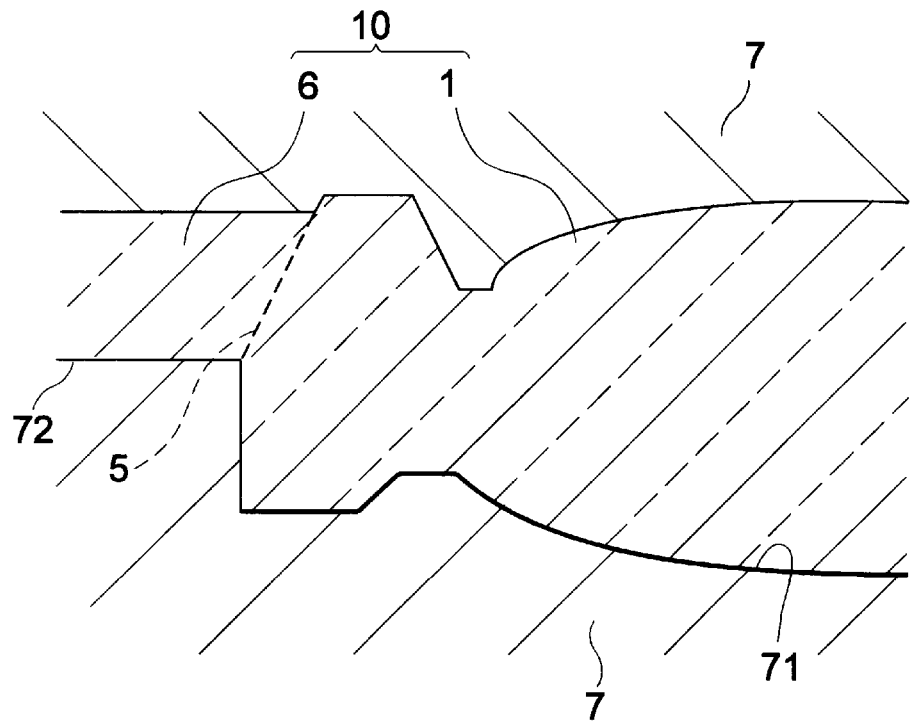
FIG. 3 is an explanatory view of a process of making the plastic lens.

FIG. 3 is an explanatory view of a process of making the plastic lens 1. As shown in FIG. 3, a resin is run into a space between dies 7 and 7, and the resin is injected into a cavity 71 (hollow portion) which conforms to the outer shape of the plastic lens 1. Here, a gate 72 which becomes an opening for injecting the resin into the cavity 71 is formed at an inner wall portion which becomes the tapered surface 5 of the plastic lens 1. As the molding method, injection molding or the like is employed.

When the resin injected into the cavity 71 is solidified, the thus molded article 10, which becomes the plastic lens 1, is taken out from the dies. The molded article 10 is in a state where the plastic lens 1 and the gate section 6 are united together, such that the gate section 6 is continuous with the tapered surface 5. Then, the gate section 6 is separated from the plastic lens 1. In this separating operation, an end mill or the like is used for cutting off the gate section 6, for example. It is sufficient for this cutting operation to be effected such that, as shown in FIG. 2, the gate cutting section 51 left after cutting does not project outside the extension surface of the reference surface 4, without necessitating any strict processing accuracy for making it flush with the tapered surface. As a result, the cutting operation can be effected easily, whereby the efficiency in manufacture of the plastic lens 1 can be improved. Preferably, the gate section 6 is cut off so as to yield a cutting surface substantially parallel to the tapered surface 5.

After cutting the gate section 6, it is unnecessary to remove the gate cutting section 51 remaining on the tapered surface 5 by grinding or the like. The manufacture of the plastic lens 1 is completed after the gate section 6 is cut off.

Next, a method of using the plastic lens 1 will be explained.

Figure 4:
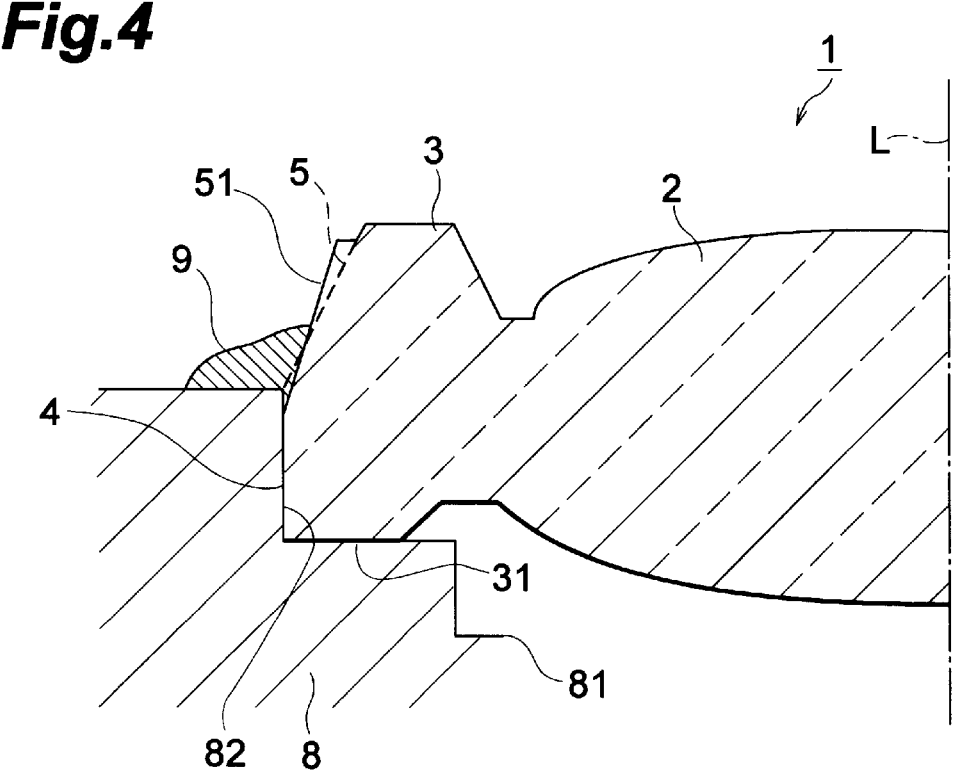
FIG. 4 is an explanatory view of a method of using the plastic lens.
Figure 5:
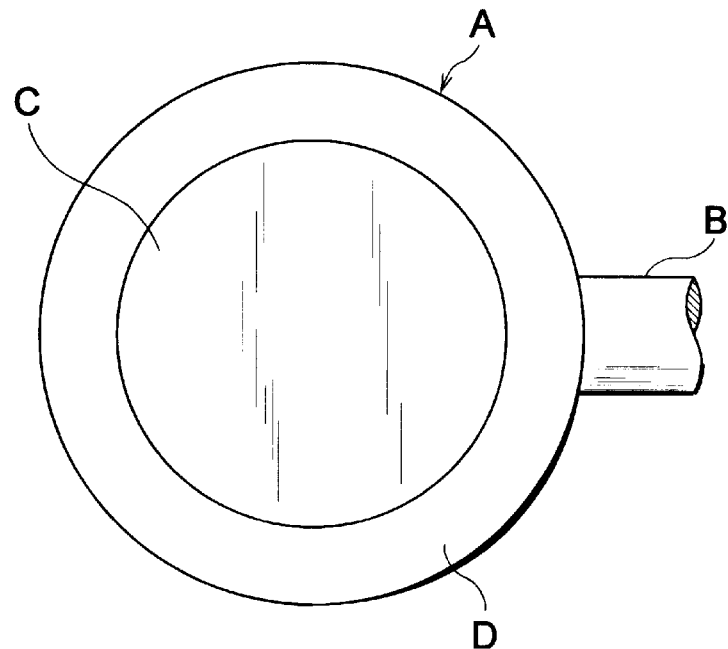
FIG. 5 is an explanatory view of a prior art lens.
Figure 6:
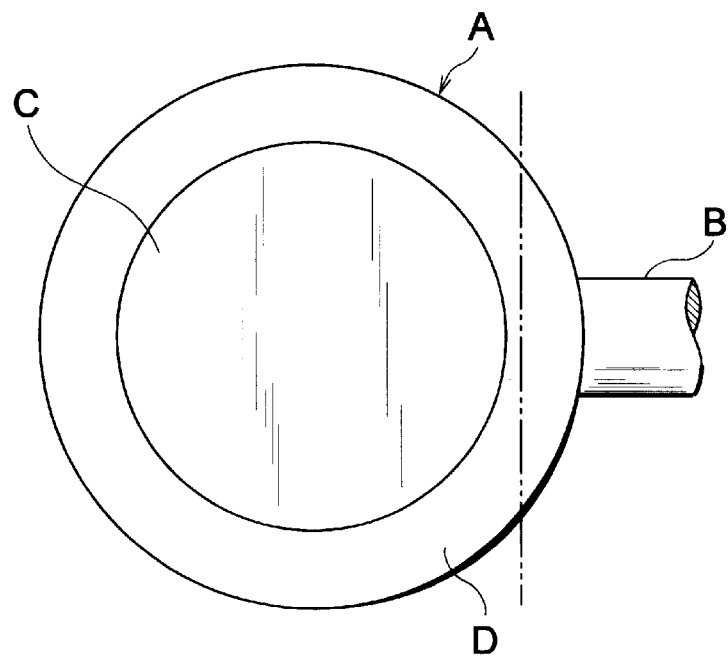
FIG. 6 is an explanatory view of an experimental method developed by the inventors for separating a gate section from a plastic lens.
Figure 7:
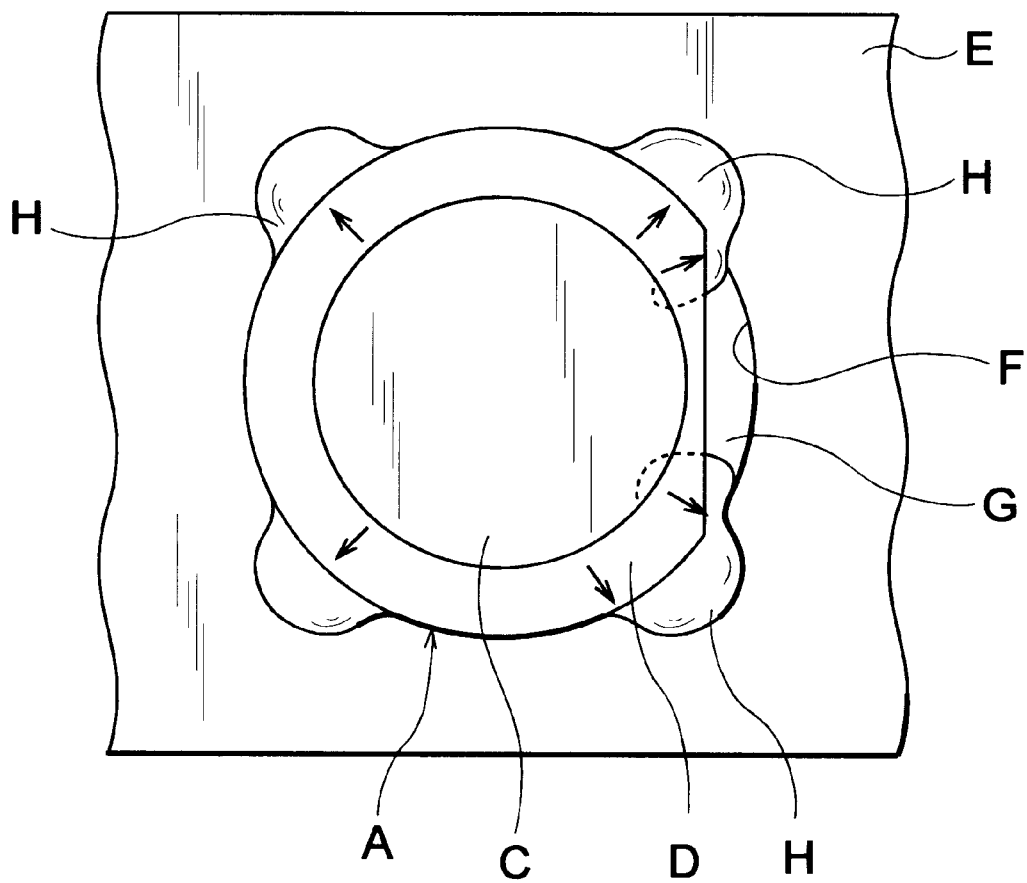
FIG. 7 is an explanatory view of a lens formed by the experimental method of FIG. 6 mounted in a lens holder.

FIG. 4 is a view showing an example of methods of using the plastic lens 1. As shown in FIG. 4, the plastic lens 1 is attached to a holder 8 installed in an optical system or the like for CD, DVD, and so forth. It is used such that the tapered surface 5 and the reference surface 4 respectively face a storage medium such as CD (upper side in FIG. 4) and a light source (lower side in FIG. 4). Employed as the holder 8 is one formed with an aperture stop 81 defining an F number for guiding light. The aperture stop 81 is formed with a larger diameter section 82 for attaching the plastic lens 1. The larger diameter section 82 has an inner diameter substantially the same as the outer diameter of the reference surface 4. Consequently, when the plastic lens 1 is fitted into the larger diameter section 82, substantially no gap occurs between the inner peripheral surface of the larger diameter section 82 and the reference surface 4. Also, at this time, since the plastic lens 1 has no portion projecting outside the reference surface 4, the fitting operation can be performed smoothly, thus allowing the plastic lens 1 to be positioned accurately. The position of the plastic lens 1 is based on the reference surface 4 in the direction orthogonal to the optical axis L and on the bottom surface 31 in the direction in parallel to the optical axis L.

Since the gate cutting section 51 projects from the tapered surface 5 in the plastic lens 1, the resin injecting direction or the like upon making the plastic lens 1 can be easily seen. Consequently, as the plastic lens 1 is disposed such that the gate cutting section 51 is directed to a desired direction, the optical property of the plastic lens 1 resulting from the resin injecting direction or like is utilized, whereby characteristics of the optical system including the plastic lens 1 can be improved.

After the plastic lens 1 is disposed within the larger diameter section 82, as shown in FIG. 4, an adhesive 9 is applied to an outer peripheral portion of the flange section 3 of the plastic lens 1, and the plastic lens 1 is secured to the holder 8. Here, since substantially no gap exists between the inner peripheral surface of the larger diameter section 82 and the reference surface 4 of the plastic lens 1, the adhesive 9 is prevented from intruding therebetween to such an extent that optical functions are damaged. Thus eliminated are shortcomings in which the adhesive 9 reaches the rear side (lower side in FIG. 4) of the plastic lens 1 and adheres to the optically functioning section 2, for example. Since the reference surface 4 of the plastic lens 1 is in contact with the inner peripheral surface of the enlarged diameter section 82 throughout the periphery, as long as the adhesive 9 is uniformly attached to the plastic lens 1 in its circumferential direction, the plastic lens 1 is prevented from partly being pulled when the adhesive 9 contracts. Accordingly, optical characteristics of the plastic lens 1 will not deteriorate due to contraction of the adhesive 9.

As mentioned above, in the plastic lens 1 and method of making the same in accordance with this embodiment, the gate section 6 used for making the plastic lens 1 is cut off without cutting a part of the flange section 3. Accordingly, the adhesive 9 can appropriately adhere to the plastic lens 1 upon attachment, whereby distortion of the optically functioning section 2 due to contraction of the adhesive 9 can be reduced. Consequently, defects in attachment can be effectively prevented.

Also, upon manufacture, as the gate section 6 is made continuous with the tapered surface 5 located closer to the center side than is the reference surface 4, burrs and the like of the cutting surface of the gate section 6 do not obstruct attachment. As a result, the grinding process of the cutting surface and the like can be omitted, thus allowing efficiency in manufacture to improve.

Further, since the cutting surface with burrs can be left as it is, the position where the gate section 6 has existed becomes clear. Therefore, in view of the position of the gate section 6, optical properties of the optically functioning section 2 can be determined accurately.

As explained in the foregoing, in accordance with the present invention, the following effects can be obtained.

Namely, since the gate section for manufacture is cut off without substantially cutting the flange section, an adhesive can appropriately adhere to the plastic lens upon attachment, whereby the distortion of the optically functioning section due to contraction of the adhesive can be reduced. Accordingly, defects in attachment can be effectively prevented.

Also, upon manufacture, as the gate section is made continuous with the tapered surface located closer to the center side than is the reference surface, burrs and the like of the cutting surface of the gate section do not obstruct attachment. As a result, a grinding process of the cutting surface and the like can be omitted, thus allowing efficiency in manufacture to improved.

Further, since the cutting surface with burrs can be left as it is, the position where the gate section has existed becomes clear. Therefore, in view of the position of the gate section, optical properties of the optically functioning section can be determined accurately.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A plastic lens comprising an optically functioning section and a flange section disposed at an outer periphery thereof, wherein an outer peripheral portion of said flange section is provided with a reference surface which becomes a reference for attachment;

wherein said outer peripheral portion of said flange section is provided with a taper surface having a diameter tapering down from said reference surface along an optical axis of said optically functioning section; and wherein at least said taper surface is formed with a gate cutting section.

2. A plastic lens as claimed in claim 1 wherein said gate cutting section projects from said tapered surface without projecting outside said reference surface.

3. A plastic lens as claimed in claim 2 wherein said gate cutting section extends to said reference surface.

4. A plastic lens as claimed in claim 1 wherein said gate cutting section has a cut surface substantially parallel to said tapered surface.

5. A plastic lens as claimed in claim 1 wherein said gate cutting section projects from said tapered surface sufficiently far to indicate a resin injecting direction of said lens.

* * * * *